(12) United States Patent
Rentz

(10) Patent No.: US 9,906,093 B2
(45) Date of Patent: Feb. 27, 2018

(54) UNIVERSAL HOUSING MOUNT

(71) Applicant: Delaware Capital Formation, Inc., Wilmington, DE (US)

(72) Inventor: Matthew Rentz, Shelby Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 184 days.

(21) Appl. No.: 14/529,946

(22) Filed: Oct. 31, 2014

(65) Prior Publication Data

US 2016/0126803 A1    May 5, 2016

(51) Int. Cl.
   *H02K 5/26*      (2006.01)
   *H02K 41/02*     (2006.01)
   *F15B 15/14*     (2006.01)

(52) U.S. Cl.
   CPC .......... *H02K 5/26* (2013.01); *F15B 15/1423* (2013.01); *F15B 15/1428* (2013.01); *H02K 41/02* (2013.01)

(58) Field of Classification Search
   CPC ...... H02K 41/00–41/065; H02K 33/00–33/18; H02K 5/00–5/26
   USPC ..................... 310/89, 12.01–12.33
   See application file for complete search history.

(56) References Cited

U.S. PATENT DOCUMENTS

| | | | |
|---|---|---|---|
| 3,116,058 A | 12/1963 | Blatt | |
| 3,371,923 A | 3/1968 | Blatt | |
| 4,494,739 A | 1/1985 | Valentine | |
| 4,637,597 A | 1/1987 | McPherson et al. | |
| 4,736,675 A * | 4/1988 | Stoll | F15B 15/1414 92/128 |
| 5,118,088 A | 6/1992 | Sawdon | |
| 5,192,058 A | 3/1993 | VanDalsem et al. | |
| 5,226,638 A | 7/1993 | Ausilio | |
| 5,415,383 A | 5/1995 | Ausilio | |
| 5,898,244 A * | 4/1999 | Kotsianas | H02K 33/12 310/12.21 |
| 5,941,513 A | 8/1999 | Moilanen et al. | |
| 6,059,277 A | 5/2000 | Sawdon et al. | |
| 6,079,896 A | 6/2000 | Dellach | |
| 6,129,345 A | 10/2000 | Chiorino | |
| 6,273,408 B1 | 8/2001 | Moilanen et al. | |
| 6,336,390 B1 | 1/2002 | Sato et al. | |
| 6,364,302 B2 | 4/2002 | Ausilio | |

(Continued)

FOREIGN PATENT DOCUMENTS

| | | |
|---|---|---|
| DE | 93 01 112 | 7/1993 |
| EP | 1 223 347 | 7/2002 |

(Continued)

*Primary Examiner* — Thomas Truong
(74) *Attorney, Agent, or Firm* — Harness, Dickey & Pierce, P.L.C.

(57) ABSTRACT

A universal mounting housing for a linear actuator has a housing with a wall having an inner surface and an outer surface with at least one bore to enable securement of the housing. The at least one bore has an axial open portion that enables passage of attachment members. The at least one bore has a first and second diameter portion. The first diameter portion extends a length of the open portion. The diameter is of a size necessitating the attachment members to be axially moved into the at least one bore. The second diameter portion is larger than the first diameter portion. The second diameter portion receives a head portion of the attachment member.

7 Claims, 7 Drawing Sheets

(56) References Cited

U.S. PATENT DOCUMENTS

Figure 1:
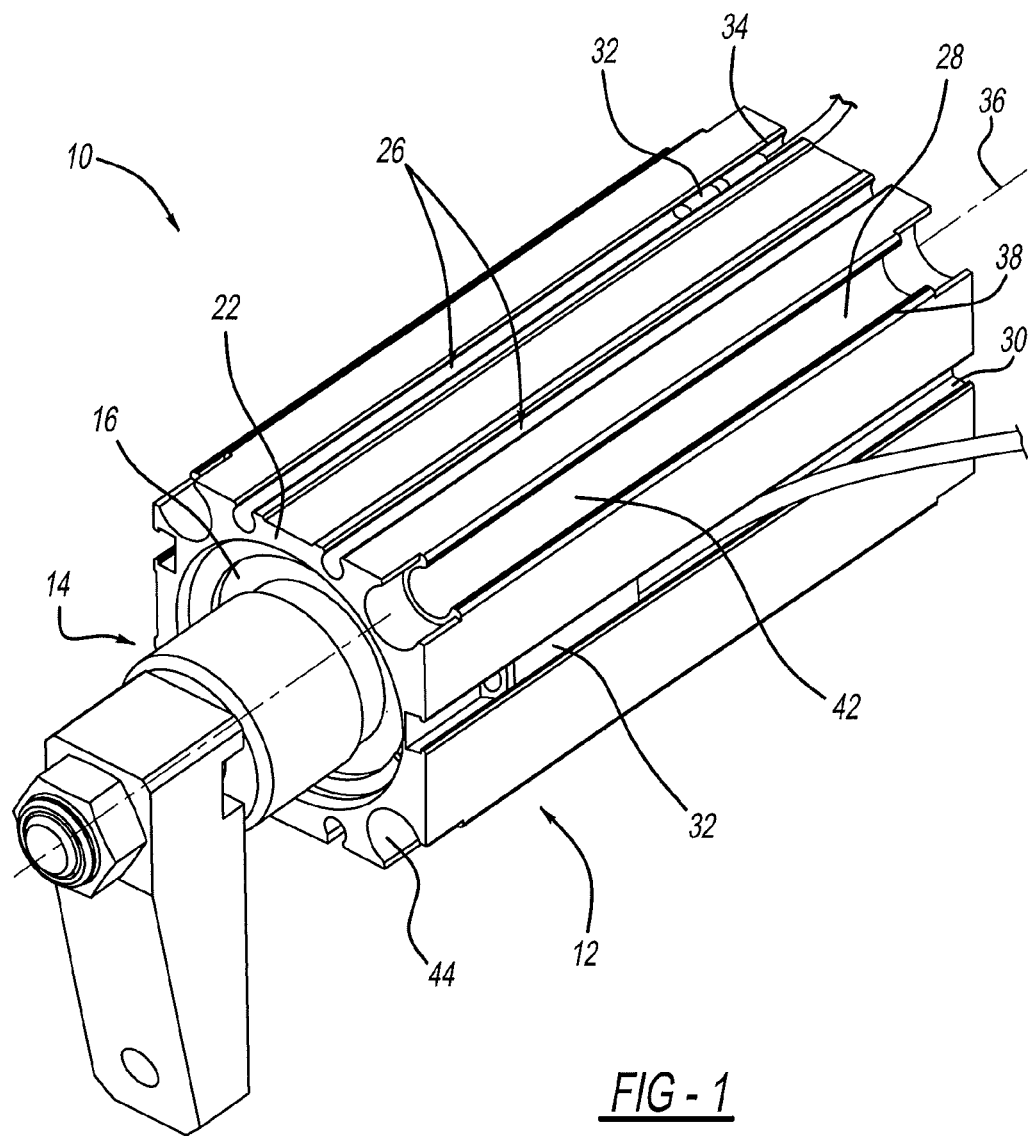

| | | |
|---|---|---|
| 6,378,856 B1 | 4/2002 | Takahashi |
| 6,439,560 B2 | 8/2002 | Sawada et al. |
| 6,698,736 B2 | 3/2004 | Dugas et al. |
| 6,756,707 B2 * | 6/2004 | Hochhalter ............. F16H 25/20 310/20 |
| 7,021,687 B2 | 4/2006 | Moilanen et al. |
| RE39,786 E | 8/2007 | Dellach |
| RE41,223 E | 4/2010 | Dellach |
| 8,033,536 B2 | 10/2011 | Le Devehat |
| 8,136,803 B2 | 3/2012 | McIntosh et al. |
| 2004/0164474 A1 | 8/2004 | Healy |
| 2008/0315478 A1 | 12/2008 | McIntosh |
| 2012/0103181 A1 | 5/2012 | Xug |

FOREIGN PATENT DOCUMENTS

| | | |
|---|---|---|
| GB | 2 316 132 | 2/1998 |
| WO | WO2014/145557 | 9/2014 |

* cited by examiner

UNIVERSAL HOUSING MOUNT

The present disclosure relates to actuators and, more particularly, to linear actuators with a universal mounting housing.

FIELD

Various types of actuators exist in the art. These actuators generally include a housing for a specific need. Thus, the linear actuator housing is changed for each particular application. Thus, numerous housings are required in order to handle the various applications. While the internal components of the housings are substantially the same, the housings are modified to be positioned in the various applications. This adds increased cost since a number of housings are required in order to meet the needs of the different applications. Accordingly, there is a desire for a housing that enables multiple positions for various applications utilizing a single housing. Further, it is desirable to have a housing that can be modified to fit a particular application.

BACKGROUND

Accordingly, the present disclosure provides an actuator housing that provides these features. The present actuator housing enables the housing to be utilized in a multitude of positions. The present housing enables a single housing to be manufactured to reduce the cost of manufacturing. The present disclosure provides different attachment members to secure the housing for various applications.

SUMMARY

According to the disclosure, a universal mounting housing for a linear actuator comprises a housing having a wall to surround a linear actuator piston assembly. The wall has an inner surface to receive the piston assembly. The wall outer surface includes at least one bore to enable securement of the housing. The at least one bore has an axial open portion to enable passage of an attachment member. The at least one bore has a first and second diameter portion. The first diameter portion extends a length of the open portion. The diameter is of a size necessitating the attachment members to be axially moved into the at least one bore. The second diameter portion is larger than the first diameter portion. The second diameter portion receives a head portion of the attachment member. Generally, a plurality of bores is present on the housing. The plurality of bores enable multi-positioning of the housing. The attachment member includes a headed fastener. Additionally, the attachment member may include an adapter sleeve. The attachment member may include a stock. Further, the attachment member may include threaded ends.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an actuator.

Figure 2:
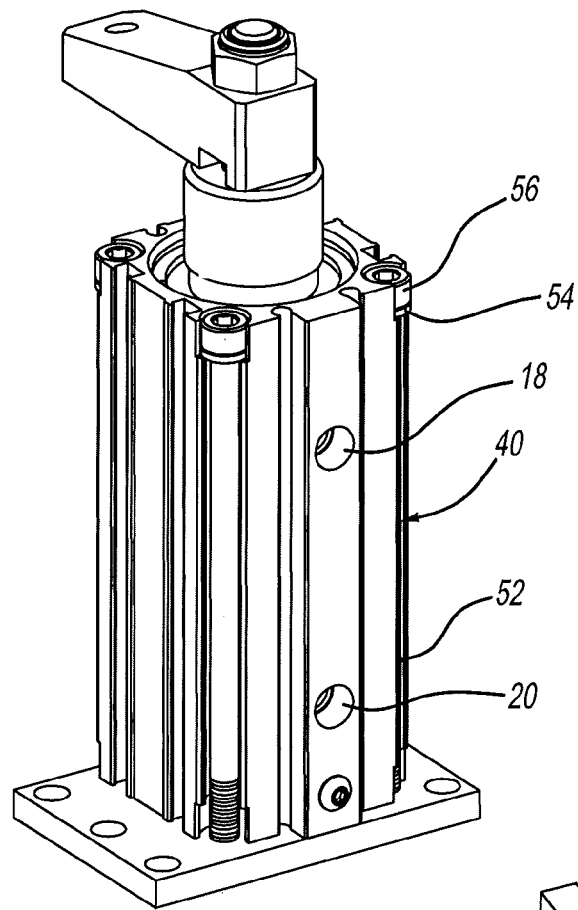
Figure 3:
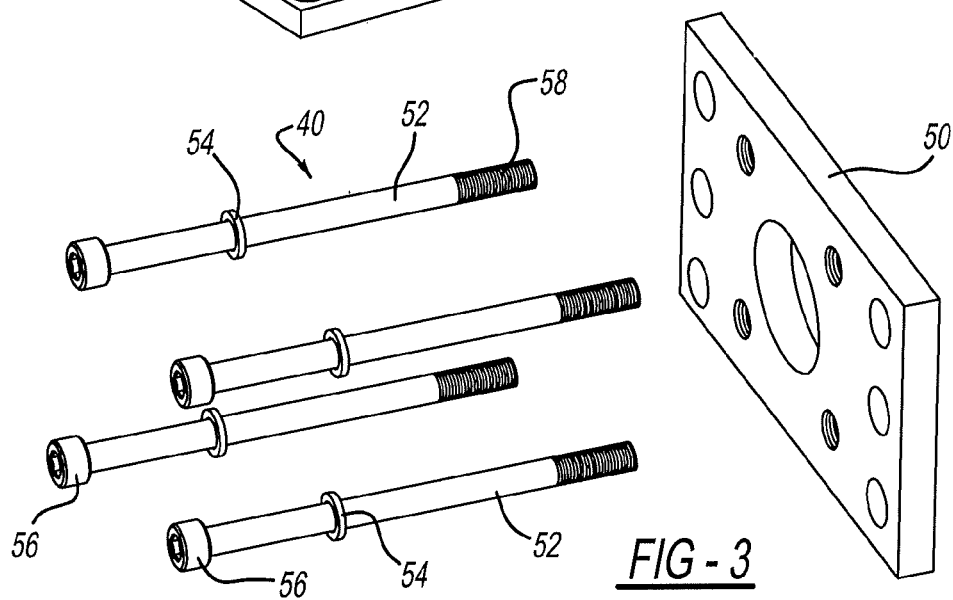
Figure 4:
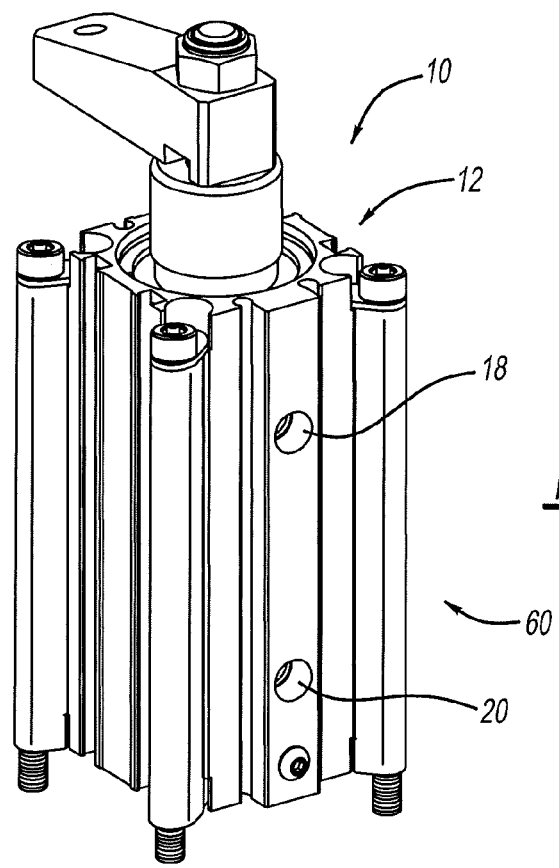
Figure 5:
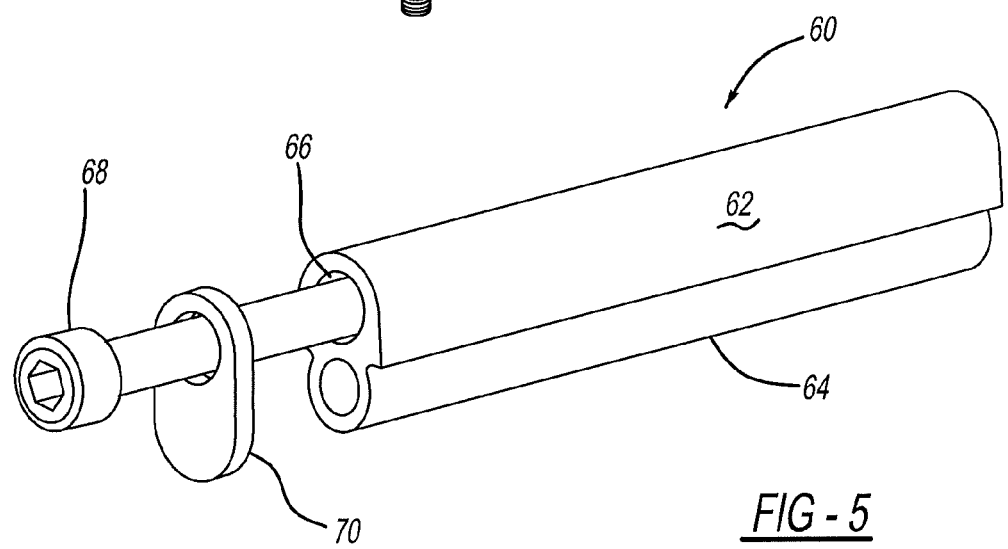
Figure 6:
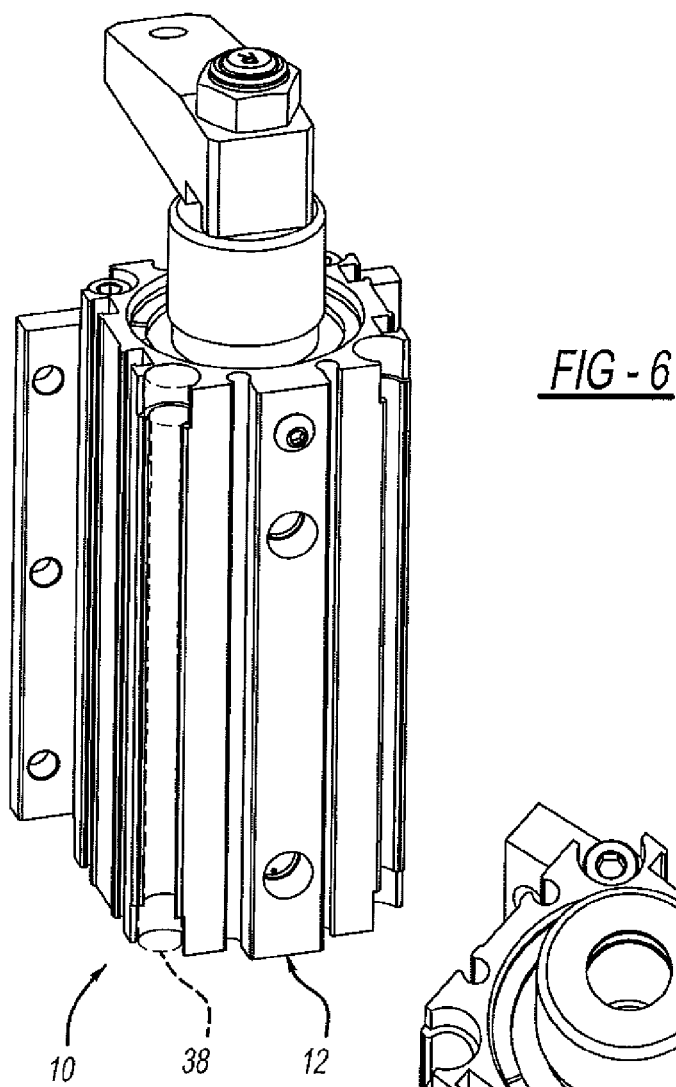
Figure 7:
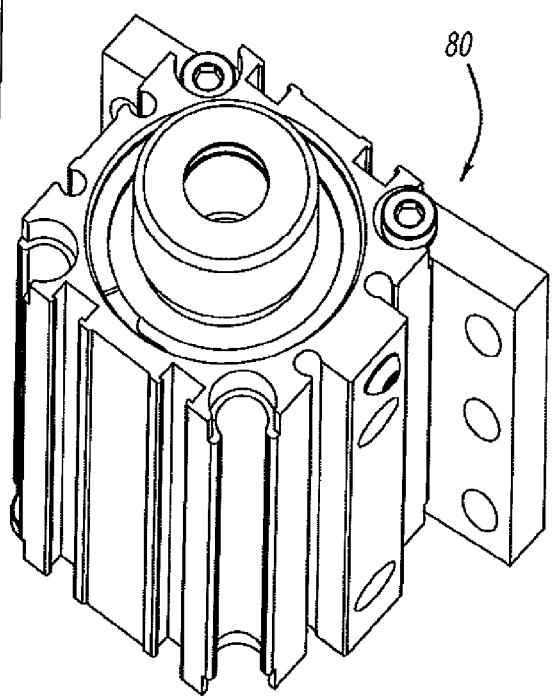
Figure 8:
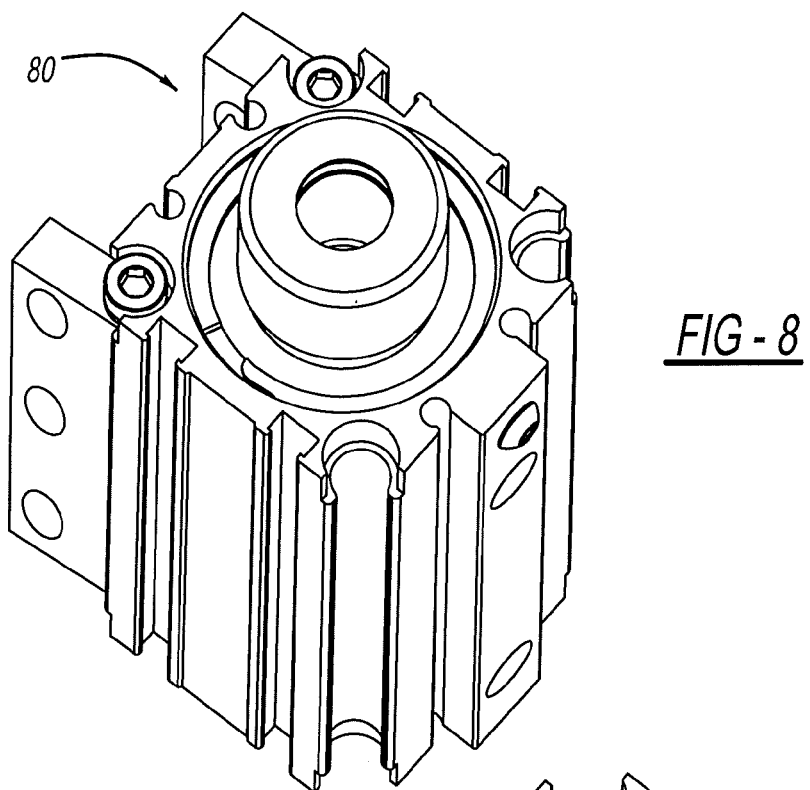
Figure 9:
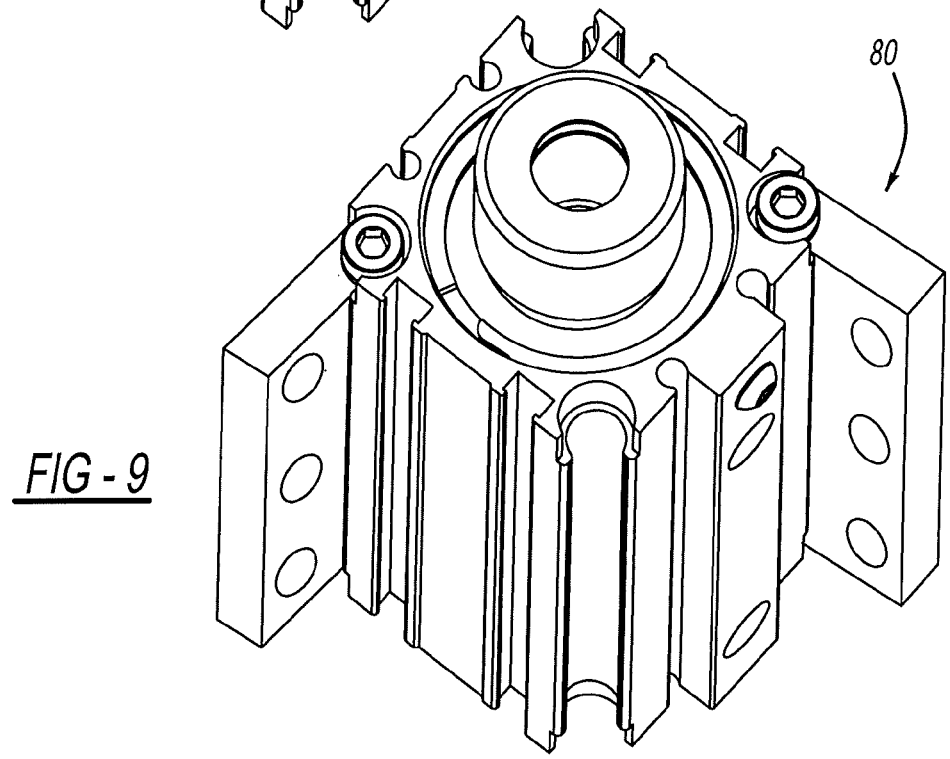
Figure 10:
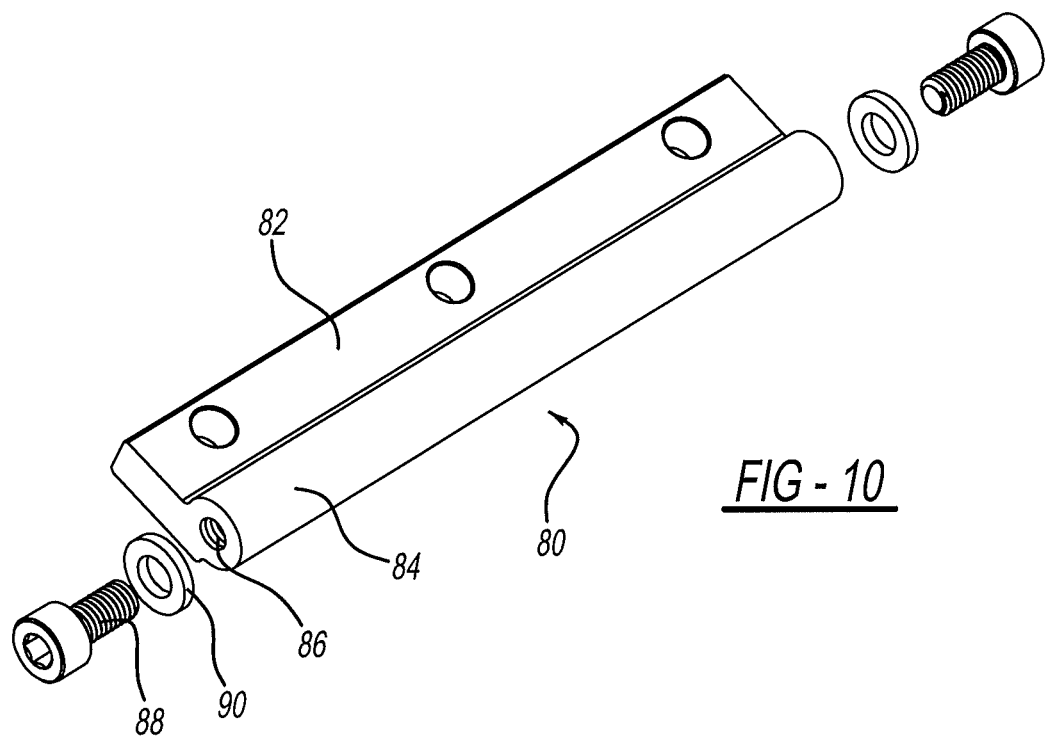
Figure 12:
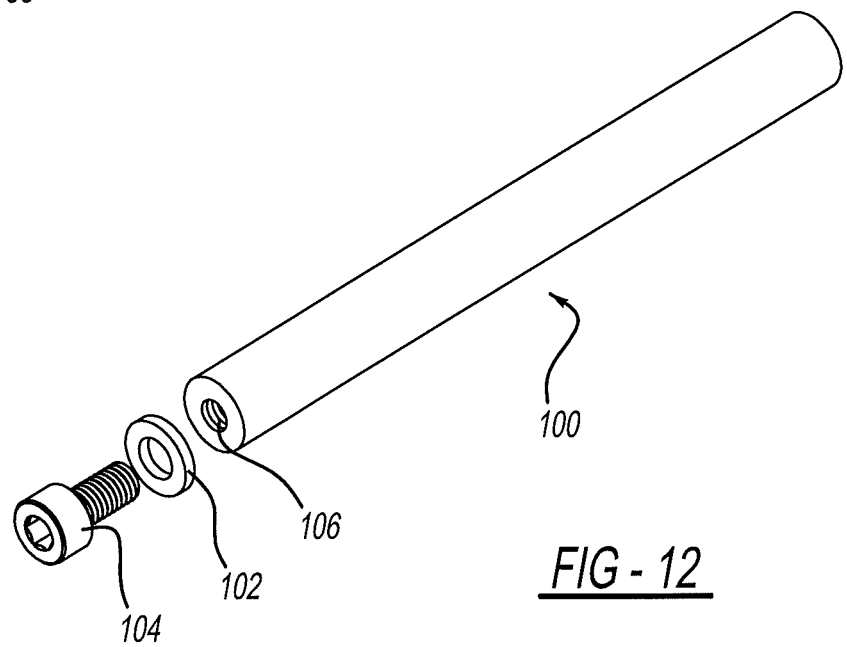
Figure 11:
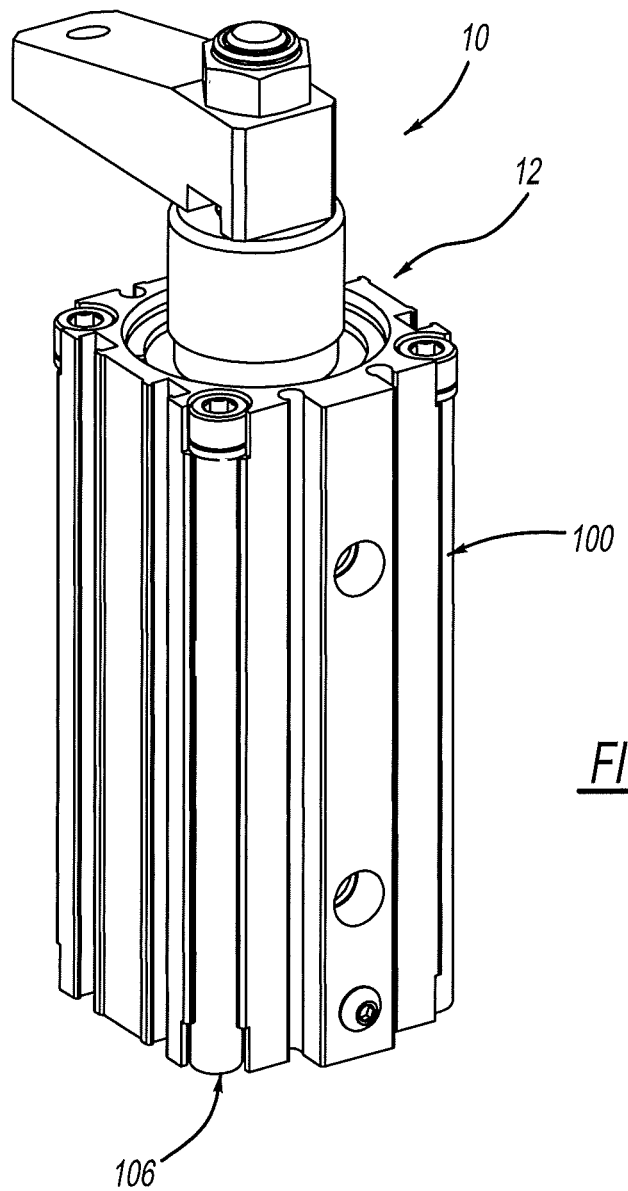

FIG. 2 is a perspective view of an actuator.
FIG. 3 is a perspective view of an attachment member.
FIG. 4 is a view like FIG. 2.
FIG. 5 is a perspective view of an attachment member.
FIGS. 6-9 are perspective views like FIG. 2.
FIG. 10 is a perspective view of an attachment member.
FIG. 11 is a view like FIG. 2.
FIG. 12 is a perspective view of an attachment member.

DETAILED DESCRIPTION

Example embodiments will now be described more fully with reference to the accompanying drawings.

Turning to the figures, a linear actuator is illustrated and designated with the reference numeral 10. The linear actuator includes a housing 12 surrounding an actuating piston assembly 14. The actuating piston assembly 14 moves within a cylinder 16 within the housing 12. The housing includes inlets 18, 20 that receive conduits that provide fluid into the housing cylinder to actuate the piston assembly 14.

The housing 12 includes a wall 22 that includes an interior surface that defines the cylinder 16. The exterior surface 24 of the housing is defined by a plurality of channels 26 and open bores 28. One of the channels 26, 30 has an overall T-shape in cross section to receive at least one sensor 32. The sensor 32 makes it easy to determine when the clamp is fully opened or clamped. The sensor 32 may be a Hall effect switch and activated by a magnetic piston ring on the piston assembly 14. One sensor 32 enables sensing of the opened or closed position. Two sensors 32 enable sensing of both positions.

The other channels 34 have a cylindrical cross-section. These channels 34 may be utilized to receive sensors, fasteners or the like. The channels 34 extend the length of the housing.

There is at least one bore 28 and preferably four bores 28. The bores 28 are positioned about the housing 12 such that the axes 36 of the bores 28 connect with one another to form a rectangle. Preferably, the alternating bores 28 are diametrically opposite with one another.

The bores 28 include an axial open sector portion 38. The bores 28 enable passage of an attachment member 40. The bore 28 includes first and second diameter portions 42, 44. The first diameter portion 42 extends a length of the axially opened sector portion 38. The diameter is of a size necessitating the attachment member 40 to be axially moved into the bores 28 along the axes 36. The second diameter portion 44 is larger than the first diameter portion 42. The second diameter portion 44 is positioned at the ends of the first diameter portion 42. The second diameter portion 44 receives a head portion or the like, such as a washer, of the attachment member 40.

As illustrated in FIGS. 2 and 3, the attachment member 40 may include a flange 50 with a plurality of tie bolts 52 with washers 54 including a cap head 56 positioned in the bores 28. The bolt 52 includes threads 58 that secure with the flange 50. The cap heads 56 are positioned in the second diameter portion 44 of the bore 28.

A second attachment element is illustrated in FIGS. 4 and 5. An adapter sleeve 60 includes a body portion 62 with an extending receiving portion 64. The receiving portion 64 has a diameter to fit axially into the first diameter portion 42 of the bore 28. The body portion 62 includes a bore 66 to receive a socket head cap screw 68. Additionally, a washer 70 is provided that fits into the second diameter bore portion 44 to enable the extruded adapter sleeve 60 to be retained onto the housing 12. Also, a flange 50 or the like would be provided to receive the threaded ends of the screws 68.

As illustrated in FIGS. 6-10, an extruded stock 80 can be secured in the housing bore 28. The extruded stock 80 includes a body portion 82 with a receiving portion 84. The receiving portion 84 is cylindrical and this size to be axially slid into the first diameter portion 42 of the bore 28. The receiving portion 84 includes threaded ends 86 to receive threaded cap screws 88 and washers 90 to secure the stock 80 to the housing 12. The stock 80 may be positioned in various positions to enable straight or corner fittings as illustrated in FIGS. 6 through 9.

Additionally, as in FIGS. 11 and 12, a tube 100 may be positioned in the first diameter portion 42 of the bore 28. The tube 100 may extend from one end or the other of the housing 12. A washer 102 and a cap screw 104 are provided to secure the tube 100 with the housing 12. Additionally, a flange 50 or the like can be provided with fasteners 104 passing in to the other end of the tube 100. Generally, both ends of the tube 100 include threads 106 to receive fasteners.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A universal mounting housing for a linear actuator comprising:

a housing having a wall for surrounding a piston assembly, the wall having an inner surface to receive the piston assembly, the wall has an outer surface including at least one bore to enable securement of the housing; the at least one bore extending from one end of the housing wall to another end of the housing wall, the at least one bore defining an axis, a radially open sector portion extending along the axis of the bore from the one end of the housing wall to the other end of the housing wall, the open sector portion providing an axially extending opening or window along the housing wall from one end of the housing to the end of the housing, the at least one bore enabling passage of attachment members that can be viewed through the axial opening or window, the at least one bore having a first and second diameter portion, the first diameter portion extending along a length of the open sector portion, the diameter being of a size necessitating the attachment member to be axially moved into the at least one bore first diameter portion, the second diameter portion being larger than the first diameter portion, the second diameter portion extends along the length of the open sector portion and receives a head portion of the attachment member.

2. The universal mounting housing of claim 1, wherein a plurality of bores are on the housing wall outer surface.

3. The universal mounting housing of claim 2, wherein the plurality of bores enable multi-positioning of the housing.

4. The universal mounting housing of claim 1, wherein the attachment member is a headed bolt.

5. The universal mounting housing of claim 1, wherein the attachment member includes an adapter sleeve.

6. The universal mounting housing of claim 1, wherein the attachment member includes a stock.

7. The universal mounting housing of claim 1, wherein the attachment member includes a tube.

* * * * *